(12) United States Patent
Alves Marinho Ferreira et al.

(10) Patent No.: US 11,796,487 B2
(45) Date of Patent: Oct. 24, 2023

(54) DEVICE, UNIT AND METHOD FOR DETECTING ANNULAR FLOODING WITH GAMMA TRANSMISSION IN A FLEXIBLE PIPE

(71) Applicants: PETROLEO BRASILEIRO S.A.—PETROBRAS, Rio de Janiero (BR); UNIVERSIDADE FEDERAL DO RIO DE JANEIRO—UFRJ, Rio de Janiero (BR)

(72) Inventors: Carla Alves Marinho Ferreira, Rio de Janeiro (BR); Carlos Eduardo Maia De Souza, Rio de Janeiro (BR); Edgar Francisco Oliveira De Jesus, Rio de Janeiro (BR); Joao Marcio De Castilho Santos, Rio de Janeiro (BR); Nei Mariano Da Fonseca Junior, Rio de Janeiro (BR); Ricardo Tadeu Lopes, Rio de Janeiro (BR)

(73) Assignees: PETROLEO BRASILEIRO S.A.—PETROBRAS, Rio de Janeiro (BR); UNIVERSIDADE FEDERAL DO RIO DE JANEIRO—UFRJ, Rio de Janiero (BR)

( * ) Notice: Subject to any disclaimer, the term of this patent is extended or adjusted under 35 U.S.C. 154(b) by 0 days.

(21) Appl. No.: 17/049,775

(22) PCT Filed: Mar. 12, 2020

(86) PCT No.: PCT/BR2020/050086
§ 371 (c)(1),
(2) Date: Oct. 22, 2020

(87) PCT Pub. No.: WO2020/181349
PCT Pub. Date: Sep. 17, 2020

(65) Prior Publication Data
US 2021/0247332 A1 Aug. 12, 2021

(30) Foreign Application Priority Data
Mar. 14, 2019 (BR) ...................... 10 2019 004976 6

(51) Int. Cl.
*G01N 23/18* (2018.01)
(52) U.S. Cl.
CPC ......... *G01N 23/18* (2013.01); *G01N 2223/04* (2013.01); *G01N 2223/1013* (2013.01);
(Continued)

(58) Field of Classification Search
None
See application file for complete search history.

(56) References Cited

U.S. PATENT DOCUMENTS

| 7,214,942 B2 * | 5/2007 | Gardner | G01N 23/222 250/360.1 |
| 7,309,857 B2 * | 12/2007 | Gardner | G01N 23/222 250/269.3 |
| 7,656,997 B1 | 2/2010 | Anjelly | |
| 8,938,046 B2 * | 1/2015 | Hunter | G01N 23/04 378/182 |

(Continued)

FOREIGN PATENT DOCUMENTS

GB          2211708 B       4/1991
WO    WO-2015024080 A1 *   2/2015  ............... F17D 5/00

*Primary Examiner* — Thomas R Artman
(74) *Attorney, Agent, or Firm* — RAPHAEL BELLUM PLLC

(57) ABSTRACT

The present invention is related to technologies used to inspect flexible undersea pipes, in particular to detect flooding of the annular space in said pipes. The present invention discloses a device for detecting annular flooding with gamma transmission in a flexible pipe, comprising a structure (07), in which said structure (07) contains in its interior, a first pressure vessel (10) containing an encapsulated radioactive source (03) in its interior, a second pressure vessel (11) containing radiation sensors (04) in its interior, and a third pressure vessel (12), containing electronic means for collecting and amplifying signals (05) in its interior, in (Continued)

which said radiation sensors (04) are connected to the electronic means (05) for collecting and amplifying signals using an internal cable (13). The present invention also discloses a unit for detecting annular flooding with gamma transmission in a flexible pipe based on the gamma transmission technique, comprising a device (50) for detecting annular flooding with gamma transmission in a flexible pipe (01) coupled to an ROV (02), in which coupling occurs through a control arm (08) of the ROV (02), and the device is controlled and operated exclusively via the umbilical cable (06) connected to the ROV (02), and a method for detecting annular flooding with gamma transmission in a flexible pipe.

13 Claims, 3 Drawing Sheets

(52) U.S. Cl.
CPC . *G01N 2223/205* (2013.01); *G01N 2223/301* (2013.01); *G01N 2223/308* (2013.01); *G01N 2223/505* (2013.01); *G01N 2223/628* (2013.01)

(56) References Cited

U.S. PATENT DOCUMENTS

| | | | | |
|---|---|---|---|---|
| 9,400,227 | B2* | 7/2016 | Ramos | G01M 3/28 |
| 9,897,558 | B2* | 2/2018 | Bowdon | G01N 23/04 |
| 10,663,422 | B2* | 5/2020 | McNab | G01N 27/02 |
| 10,697,905 | B2* | 6/2020 | Featonby | G01N 23/20066 |
| 10,989,673 | B2* | 4/2021 | Venkatachalam | G01N 23/046 |
| 2004/0256548 | A1* | 12/2004 | Gardner | G01V 5/125 250/269.7 |
| 2004/0256566 | A1* | 12/2004 | Gardner | G01V 5/125 250/360.1 |
| 2012/0170610 | A1* | 7/2012 | Ramos | G01M 3/28 374/5 |
| 2012/0275566 | A1* | 11/2012 | Hunter | G03B 42/028 250/483.1 |
| 2015/0241572 | A1* | 8/2015 | Bowdon | G01N 23/04 378/64 |
| 2017/0122894 | A1* | 5/2017 | McNab | G01N 27/24 |
| 2018/0100816 | A1 | 4/2018 | Featonby | |
| 2019/0250118 | A1* | 8/2019 | McNab | G01N 17/02 |
| 2019/0346383 | A1* | 11/2019 | Venkatachalam | G01N 23/046 |
| 2021/0247332 | A1* | 8/2021 | Alves Marinho Ferreira | E21B 47/001 |

\* cited by examiner

DEVICE, UNIT AND METHOD FOR DETECTING ANNULAR FLOODING WITH GAMMA TRANSMISSION IN A FLEXIBLE PIPE

FIELD OF INVENTION

The present invention is related to technologies used to inspect flexible undersea pipes, in particular to detect flooding of the annular space in said pipes.

DESCRIPTION OF THE STATE OF THE ART

Flexible pipes are widely used in the flow of offshore oil in the oil and gas industry, both as production lines interconnecting the wells (Christmas trees) to the platforms, as well as transfer lines connecting platforms to each other.

An interconnection may be comprised of several sections and has a static part (flowline) and a dynamic part, known as a riser. These pipes are comprised of several superimposed coaxial layers with specific functions.

The annular region is defined as that between the polymeric layer known as the sealing barrier and the external layer, which is also polymeric. The structural metal layers of the pipe are housed in this area, and are known as traction armatures.

The sealing barrier is responsible for containing the internal flow to the pipe, while the external layer is responsible for preventing seawater entry. The traction armatures are responsible for supporting traction and torsion loads.

Although a large part of the risers in operation in the industry (the older ones) were designed considering the condition of a dry annular space, due to installation or operating conditions, damage to the external layer allows seawater to enter, bringing the armatures into contact with this water, which ends up reducing their life due to fatigue, and consequently reducing the useful life and operational continuity of the pipe.

Additionally, the high content of $CO_2$ in the pre-salt fields, and its consequent reinjection, make detection of water in the annular space even more relevant, as the carbonic gas is converted into carbonic acid when in contact with this water, which may lead to hardening and subsequent cracking of the traction armatures.

Annular flooding is currently detected by injecting nitrogen, whether or not it is associated with a vacuum test. It is only used on the top risers, which is a limitation, and there has been variability among service providers. There are some solutions for detecting annular flooding in the state of the art, based on the ultrasound method or by measuring impedance of the annular region with and without water. In addition to these methods is sensitivity to the effects of pressure from the water column, which tends to further compress the layers in the pipes against each other, reducing the opening of the annular space.

There are systems available in the market that use the technique of gamma transmission to inspect undersea pipes, however, they also fail to detect flooding in the annular space, due to the type of design (relative arrangement between the source, the sensors, and the pipe), and to the data-reading methodology used, based on collection at various positions, using fixed-time intervals. Besides the level of noise, detection sensitivity enabled by this type of system is incapable of discriminating the attenuation provided by the presence of the small volume of water that is settled inside the annular region.

Document GB2211708A discloses a conventional radiography system used to inspect rigid pipes to detect the occurrence of corrosion by measuring thickness through radiographic exposure according to the established simple view double wall layout (SVDW) and/or tangential offset. However, it is common knowledge that radiography is incapable of detecting annular flooding in flexible risers, due to the reduced effect of attenuation of the water that might be present in the annular space in the formation of the final image.

Document US20180100816(A1) discloses a gamma-transmission tomography system used to inspect rigid and flexible pipes, especially to verify loss of thickness due to corrosion, formation of internal incrustations, such as hydrates, and evaluations of geometric alterations (kneading) or functional (rupture of flexible wires). It is also claimed that said system is capable of detecting annular flooding in flexible pipes; however, as can be seen, the system presented in US20180100816(A1) contains a layout in which the source and the sensors are staggered at 180°, with the pipe/item of inspection between them, thus it is incapable of detecting annular flooding, due to the large number of thicknesses through which the radiation passes, as well as the fluid itself that is run through the pipe, which reduces the signal of interest (of water in the annular space) to the level of noise.

In regard to the collection and handling of data, the system presented in US20180100816(A1) uses the principles of computerized tomography, which comprises a method in which a large number of systematic exposures at different angles is done continuously around the pipe/object of inspection. With the aid of computers, the data referring to each of these exposures are used to mathematically reconstruct the attenuation coefficients of the elements that comprise a transversal section of this object, and thus, the image of the section exposed by the radiation is created. As this is a complex process, each exposure is done at a pre-defined time interval, which must be as short as possible so as not to make inspection burdensome in terms of total duration. The obvious disadvantage is reduction of the noise-signal relationship, and consequently of the sensitivity of the technique to the very subtle variations as well as to the attenuation of a small volume of water present in the annular space in a flexible pipe.

The purpose of the invention presented herein is an inspection system that is capable of detecting the presence of water in the annular space of a flexible pipe in operation, to maximize the capacity to detect small variations of attenuation, at any depth, representing a scenario with a wide range of applications.

As will be detailed below, the present invention seeks to resolve the problems in the state of the art described above in a practical and efficient manner.

BRIEF DESCRIPTION OF THE INVENTION

One objective of the present invention is to provide technologies for inspecting flexible undersea pipes, emphasizing the detection of flooding in the annular space of these pipes, through which detection devices and means for their adequate operation are used, wherein an encapsulated radioactive source, radiation sensors, and the electronic means for collection and amplification of signals (05) are arranged in pressure vessels, enabling that device to be used at great depths, without this harming operation due to the elevated pressure of the undersea environment.

BRIEF DESCRIPTION OF THE DESIGNS

The present invention will be described in greater detail below, referencing the attached figures, which show a non-limiting form of operation, and in which.

DETAILED DESCRIPTION OF THE INVENTION

Figure 1:
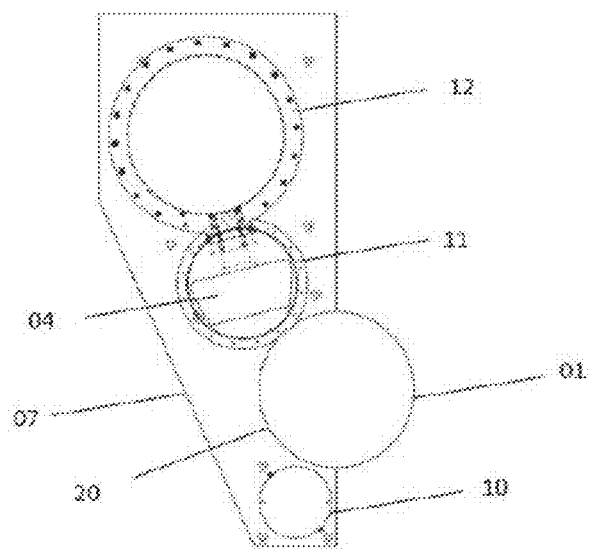
FIG. 1 shows the annular flooding detection device with gamma transmission in a flexible pipe of the present invention, with its internal components, coupled to a flexible pipe.
Figure 2:
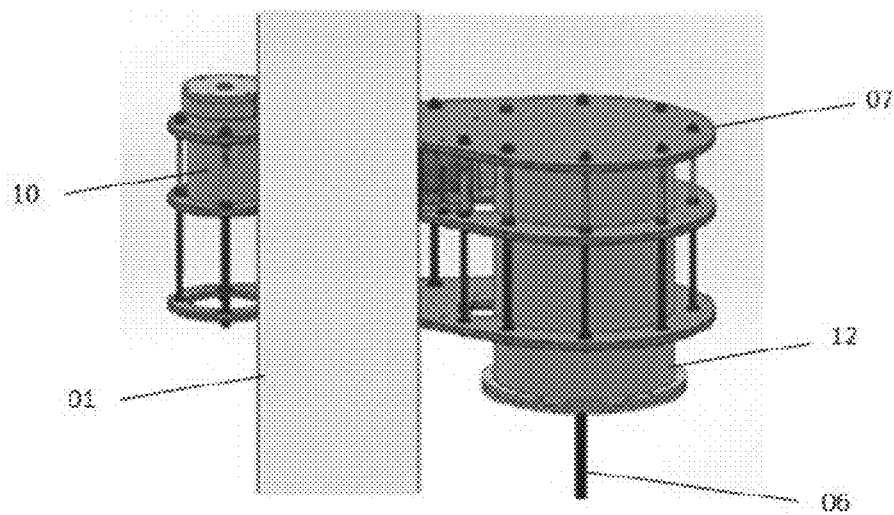
FIG. 2 shows a side view of the device of the present invention coupled to a flexible pipe.
Figure 3:
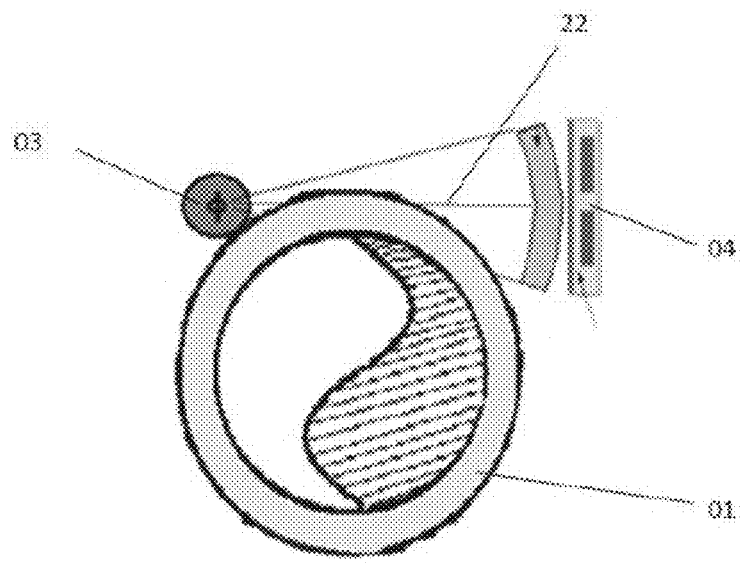
FIG. 3 shows the relative positioning between the encapsulated radioactive source, the radiation sensors and a flexible pipe.
Figure 4:
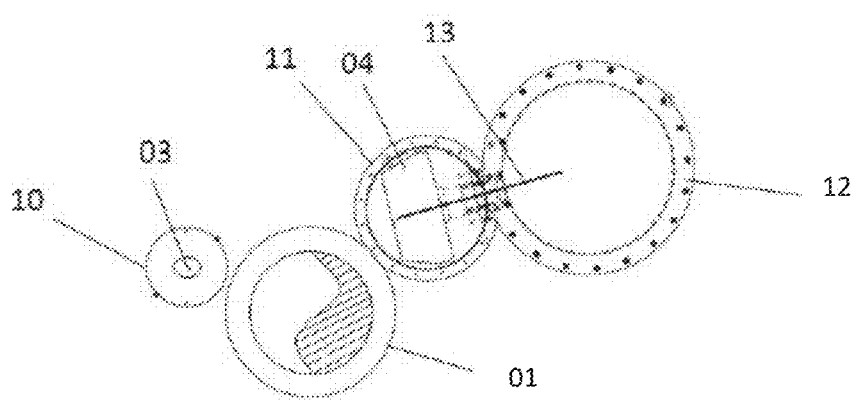
FIG. 4 shows the internal components of the present invention.
Figure 5:
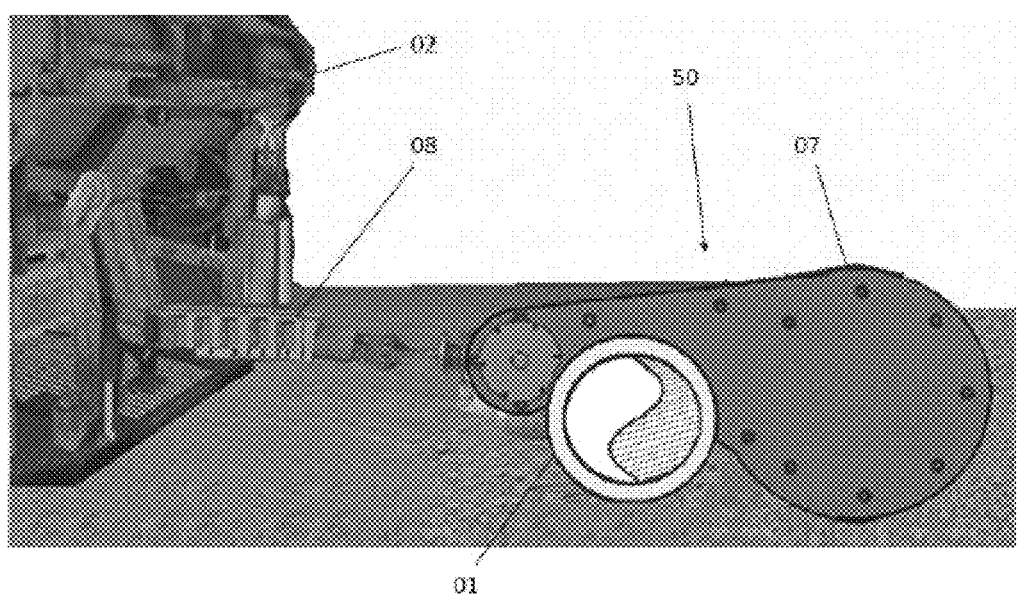
FIG. 5 shows the annular flooding detection unit with gamma transmission in a flexible pipe of the present invention.

First, note that the following description will depart from a preferential realization of the invention. As will be evident for any specialist in the matter, however, the invention is not limited to that particular realization.

The device (50) for detecting annular flooding with gamma transmission in a flexible pipe (01) of the present invention comprises a structure (07), in which said structure (07) comprises a first pressure vessel (10) positioned in its interior, comprising an encapsulated radioactive source (03) in its interior, a second pressure vessel (11) comprising radiation sensors (04) in its interior, and a third pressure vessel (12) comprising electronic means for collection and amplification of signals (05) in its interior, in which those radiation sensors (04) are connected to the electronic means of collection and amplification of signals (05) by means of an internal cable (13). On one of its sides the structure (07) contains a type of circumference arc (20), such that the structure fits into a flexible pipe (01) with a circular section. Furthermore, the structure (07) contains, on one side of the circumference arc (20), the first pressure vessel (10) comprising the encapsulated radioactive source (03), and the second pressure vessel is positioned (11) on the opposite side, comprising radiation sensors (04) such that with the housing of the structure (07) in the flexible pipe (01), an imaginary straight line (22) can be drawn between the encapsulated radioactive source (03) and the radiation sensors (04), in which the straight line (22) is tangent to the flexible pipe (01). The device (50) also contains an umbilical cable (06), whose function is to feed, control, and transmit data, in which the umbilical cable may be connected to the top side (not shown).

In addition, the encapsulated radioactive source (03) has means of moving the isotope in order to change its position inside the first pressure vessel (10), allowing the start and end of the exposure of the pipe to ionizing radiation. Hydraulic or electric activation may be used for movement, which activation comes from the umbilical cable (06).

The fact that the encapsulated radioactive source (03), the radiation sensors (04), and the electronic means for collection and amplification of signals (05) are arranged in pressure vessels allows the device (50) to be used at great depths, without its operation being impacted due to the high pressure of the environment.

The encapsulated radioactive source (03) preferentially contains the Cs-137 isotope, and the radiation sensors (04) preferentially comprise thallium-activated crystal-based cesium iodide scintillators, CsI(TI).

The present invention also contains an annular flooding detection unit for flexible pipes, based on the technique of gamma transmission comprising an annular flooding detection device (50) with gamma transmission in a flexible pipe (01) coupled to an ROV (02), in which this coupling is realized through a control arm (08) of the ROV (02), and the device is controlled and operated exclusively through the umbilical connection (06) to the ROV (02).

The present invention further comprises a method for detecting flooding in a flexible pipe (01) from a tubular body of the flexible pipe (01), associated with the device (50) described above, comprising the stages of:

a) Also inspecting on the surface a sample from a dry flexible pipe with the device (50), in which the stage of inspecting a sample from a dry flexible pipe with the device (50) comprises:

a.1) Positioning the device (50) on a certain arc of the flexible pipe (01), in which the device is positioned with the side of the structure (07) that comprises the circumference arc (20), such that it is seated on the arc of the flexible pipe (01);

a.2) Initiating exposure of the encapsulated radioactive source (03) by changing its position inside the pressure vessel (10), which may occur through hydraulic or electric activation;

a.3) Programming the radiation sensors (04) to acquire a certain number of radiation photon counts using a control device (09);

a.4) Terminating exposure of the encapsulated radioactive source (03) by returning to the initial position inside the pressure vessel (10), when all radiation sensors (04) have acquired the pre-determined number of counts.

a.5) Sending information regarding the photon counts to the electronic means for collecting and amplifying signals (05), and sending the information handled to the control device (09); This result will be used as reference for the comparison between the calculations of the accumulated time intervals, so that each radiation sensor (04) attains the pre-defined number of counts;

b) Inspecting the one desired flexible pipe with the device (50), in which the stage of inspecting the desired flexible pipe with the device (50) comprises:

b.1) Moving the device to an area close to the section of flexible pipe (01) to be inspected, in which this movement is done preferably using an ROV (02), in which the device (50) is coupled to the arm (08) of the ROV (02);

b.2) Positioning the device (50) on a certain arc of the flexible pipe (01), in which the device is positioned with the side of the structure (07) that comprises the circumference arc (20), such that it is placed on the arc of the flexible pipe (01);

b.3) Initiating exposure of the encapsulated radioactive source (03) by changing its position inside the pressure vessel (10), which may occur by hydraulic or electric activation, in which the hydraulic or electric activation is preferably done by the ROV (02);

b.4) Programming the radiation sensors (04) to acquire a certain number of radiation photon counts using a control device (09), in which the control device (09)

analyzes the information to define the status of the annular space of the flexible pipe (01), using information collected during the exposure of the arc of the tubular body of the flexible pipe (01).

b.5) Terminating the exposure of the encapsulated radioactive source (03) by returning to the initial position inside the pressure vessel (10), when all of the radiation sensors (04) have acquired the pre-determined number of counts;

b.6) Sending information on the photon counts to the electronic means for collection and amplification of signals (05), and sending the information handled to the control device (09);

c) Analyzing and comparing the results obtained in stage a) with those obtained in stage b), in order to determine if there is flooding in the annular space of the sample collected.

Optionally, the method of the present invention comprises a stage of:

d) Repositioning the device (50) in another location on the flexible pipe (01) in order to take another sample of data, increasing the inspection sample.

Optionally, the ROV (02) may be connected to a control device (09) (such as a computer) adapted to manage all electronic elements of the system, allowing the data to be acquired remotely by the work team from the deck of the ship or platform.

Thus, the radiation sensors (04) send the information referring to the photon counts to the electronic means of collection and amplification of signals (05), which sends the information handled to the control device (09). In turn the control device (09) analyzes the information to define the status of the annular space on the flexible pipe (01), using the information collected during exposure of an arc from the tubular body of the flexible pipe (01).

The gamma-transmission technique is based on the principle of attenuations of the Beer-Lambert law, which establishes that when a bundle of intensity $I_0$ photons, emitted by a radioactive source, passes through a material comprised of n layers of elements and different thicknesses, it is attenuated such that the intensity I of the emerging bundle is represented by Equation 1:

$$I = I_0 \exp\left(-\sum_{i=1}^{n} \mu i \, xi\right)$$

Where xi and µi represent, respectively, the thickness and the total or linear attenuation coefficient of each layer, $I_0$ is the intensity of the incident bundle in the sample, and I is the intensity of the bundle emerging from the sample. Since radiation absorption depends on the thickness and the density of the material, a void or a discontinuity, or any density variations inside the sample examined will be translated by location variations of the intensity of the emerging radiation.

When the annular space of the flexible pipe (01) is dry, the calculation of the accumulated time intervals for each radiation sensor (04) to attain the number of pre-defined counts will be substantially less than the calculation registered for the condition of a flooded annular space. Thus, in the tubular body of the flexible pipe (01), the mediums that the gamma radiation of the present invention will pass through will be seawater (undersea environment), polymer (protective layer), steel (armatures), and air in the annular space, in proportions that will depend on the position of each radiation sensor (04) inside the pressure vessel (11) in relation to the arc of the tubular body of the flexible pipe (01).

When the annular space of the flexible pipe (01) is flooded, the mediums that the gamma radiation of the present invention will pass through will be seawater (undersea environment), polymer (protective layer), steel (armatures), and water in the annular space, in proportions that will depend on the position of each radiation sensor (04) inside the pressure vessel (11) in relation to the tubular body of the flexible pipe (01).

The umbilical cable (06) of the ROV (02) provides pathways both for electricity (supplying the radiation sensors (04) and electronic (05)), as pathways for transmission of inspection data.

The results obtained, which correspond to the time intervals so that each radiation sensor (04) attains the number of pre-defined counts through the control device (09), are accumulated and handled statistically such that they are compared to the reading condition with a dry flexible pipe (01). This comparison is also made using statistical calculation mathematical tools, providing an immediate report on the condition of the flexible pipe (01), with at least 95% confidence.

Countless variations with respect to the form of the structure (07), the pressure vessels (10, 11 and 12) of the encapsulated radioactive source (03), of the radiation sensors (04), and the electronics (05), concerning the scope of protection of the present application, are allowed. Variations in the type of encapsulated radioactive source (03), in the types of radiation sensors (04) and electronic means of collection and amplification of signals (05) are also allowed. This reinforces the fact that the present invention is not limited to the particular configurations/realizations described above.

The invention claimed is:

1. A device for detecting annular flooding with gamma transmission in a flexible pipe, the device comprising:
    a housing structure comprising a top plate having a circumferential arc formed in a surface of the top plate, wherein the circumferential arc formed in the surface of the top plate is configured to receive the flexible pipe;
    a first pressure vessel positioned in an interior of the housing structure, the first pressure vessel comprising an encapsulated radioactive source positioned in the interior of the first pressure vessel and the first pressure vessel is positioned on a first side of the circumferential arc formed in the plate of the housing structure;
    a second pressure vessel positioned in the interior of the housing structure, the second pressure vessel comprising radiation sensors in the interior of the second pressure vessel and the second pressure vessel positioned on a second side of the circumferential arc formed in the plate of the housing structure; and
    a third pressure vessel positioned in the interior of the housing structure, the third pressure vessel comprising an electronic detection component positioned in the interior of the third pressure vessel for collecting and amplifying signals from the radiation sensors, wherein said radiation sensors are connected to the electronic detection component via an internal cable, and wherein the radiation sensors send information referring to photon counts to the electronic detection component.

2. The device for detecting annular flooding with gamma transmission in a flexible pipe in accordance with claim 1,
    wherein the housing structure further comprises a second plate having a circumferential arc formed in a surface of the second plate, the circumferential arc formed in the surface of the second plate being configured to receive the flexible pipe, and wherein the circumferential arc formed in the surface of the second plates is aligned with the circumferential arc formed in the surface of the top plate.

3. The device for detecting annular flooding with gamma transmission in a flexible pipe in accordance with claim 2, wherein the device is positioned on one of the sides of the circumferential arc to receive the flexible pipe, the first pressure vessel comprising the encapsulated radioactive source, and on the other side of the circumferential arc, the second pressure vessel containing the radiation sensors, in which with the housing of the device receiving the flexible pipe, an imaginary straight line can be drawn between the encapsulated radioactive source and the radiation sensors, in which the straight line is tangential to the flexible pipe.

4. The device for detecting annular flooding with gamma transmission in a flexible pipe in accordance with claim 1, further comprising an umbilical cable for supplying, controlling, and transmitting data.

5. The device for detecting annular flooding with gamma transmission in a flexible pipe in accordance with claim 4, wherein the encapsulated radioactive source moves to modify position of the encapsulated radioactive source inside the first pressure vessel.

6. The device for detecting annular flooding with gamma transmission in a flexible pipe in accordance with claim 5, wherein the encapsulated radioactive source moves via a hydraulic activation from the umbilical cable.

7. The device for detecting annular flooding with gamma transmission in a flexible pipe in accordance with claim 5, wherein the encapsulated radioactive source moves via an electric activation from the umbilical cable.

8. The device for detecting annular flooding with gamma transmission in a flexible pipe, in accordance with claim 1, wherein the encapsulated radioactive source comprises the Cs-137 isotope.

9. The device for detecting annular flooding with gamma transmission in a flexible pipe, in accordance with claim 1, wherein the radiation sensors comprise thallium-activated crystal-based cesium iodide scintillators, CsI(TI).

10. A system for detecting annular flooding with gamma transmission in a flexible pipe, the system comprising:
   a) an annular flooding detection device, wherein the annular flooding detection device includes:
      a housing structure comprising a top plate having a circumferential arc formed in a surface of the top plate, wherein the circumferential arc formed in the surface of the top plate is configured to receive the flexible pipe,
      a first pressure vessel positioned in an interior of the housing structure, wherein the first pressure vessel includes an encapsulated radioactive gamma transmission source positioned in the interior of the first pressure vessel and the first pressure vessel is positioned on a first side of the circumferential arc formed in the plate of the housing structure,
      a second pressure vessel positioned in the interior of the housing structure, the second pressure vessel including radioactive gamma transmission sensors in the interior of the second pressure vessel and the second pressure vessel positioned on a second side of the circumferential arc formed in the plate of the housing structure,
      a third pressure vessel positioned in the interior of the housing structure, the third pressure vessel including an electronic detection device positioned in the interior of the third pressure vessel for collecting and amplifying signals from the gamma transmission sensors, wherein the gamma transmission sensors are connected to the electronic detection component using an internal cable,
   wherein the radioactive gamma transmission sensors send information referring to photon counts to the electronic detection component; and
   b) a remotely operated vehicle (ROV) coupled to the annular flooding detection device through a control arm from the ROV, and control and operation of the annular flooding detection device is done exclusively by an umbilical cable from the ROV to the annular flooding detection device.

11. A method for detecting annular flooding with gamma transmission in a flexible pipe comprising:
   inspecting on a surface, a sample from a dry flexible pipe with the device, wherein inspecting a sample from a dry flexible pipe with the device comprises:
      positioning the device on a circumferential arc of the flexible pipe, in which the device is positioned with a side of a structure is seated on the circumferential arc of the flexible pipe;
      initiating exposure of the encapsulated radioactive source by changing position of the encapsulated radioactive source inside a pressure vessel via hydraulic or electric activation;
      programming radiation sensors to acquire a certain number of radiation photon counts using an electronic detection component;
      terminating exposure of the encapsulated radioactive source by returning to an initial position inside the pressure vessel, when all the radiation sensors have acquired the certain number of radiation photon counts;
      sending information regarding the photon counts to an electronic detection component collecting and amplifying signals, and sending the information to the electronic detection component;
      wherein the information will be stored as a reference from a dry annular condition of the flexible pipe and compared to calculations at accumulated time intervals so that each of the radiation sensors meets the pre-defined number of counts;
   inspecting a desired flexible pipe with the device, wherein the inspecting of the desired flexible pipe with the device comprises:
      moving the device to an area close to a section of the desired flexible pipe to be for inspection;
      positioning the device on a certain circumferential arc on the desired flexible pipe, wherein the device is positioned with the side of the structure that comprises the certain circumferential arc of the desired flexible pipe;
      initiating exposure of the encapsulated radioactive source by changing position of the encapsulated radioactive source inside the pressure vessel via the hydraulic or electric activation;
      programming the radiation sensors to acquire the certain number of radiation photon counts using the electronic detection component;
      wherein the electronic detection component analyzes desired information collected during the exposure of the certain circumferential arc of a tubular body of the flexible pipe to define a status of an annular space of the desired flexible pipe;
      terminating the exposure of the encapsulated radioactive source by returning to the initial position inside the pressure vessel, when all of the radiation sensors have acquired the certain number of the radiation photon counts;

sending the desired information on the radiation photon counts to the electronic detection component for collection and amplification of signals, and sending the desired information to the electronic detection component; and analyzing and comparing the reference count information against the desired information to determine if there is flooding in the annular space of the desired flexible pipe.

12. The method for detecting annular flooding with gamma transmission in a flexible pipe, in accordance with claim 11, wherein the moving of the device to the area close to the section of the desired flexible pipe is done using a remotely operated vehicle (ROV), wherein the device is coupled to the arm of the ROV.

13. The method for detecting annular flooding with gamma transmission in a flexible pipe in accordance with claim 11, wherein the hydraulic or electric activation is done by an ROV.

* * * * *